254-279 SR
OR X 7,785
7785X
E. C. BELLINGER.
Steam-Plow.
Patented Nov. 19, 1833
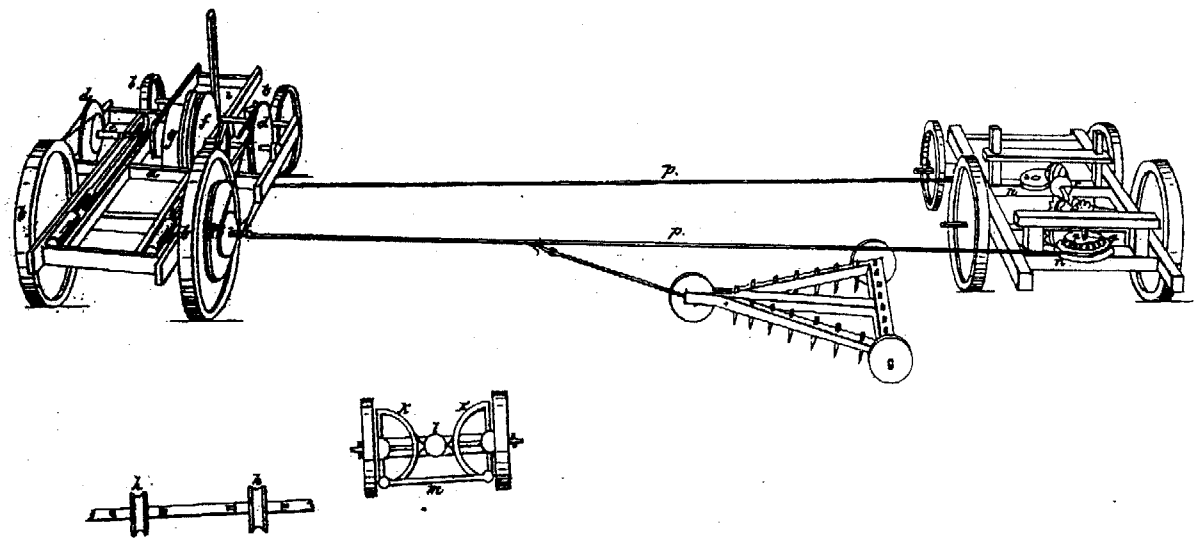

Edmund C.Bellinger, Barnwell District, South Carolina.

LETTERS PATENT. Nov. 19, 1833.

The schedule referred to in these Letters Patent and making part of the same containing description in the words of the said Edmund C.Bellinger himself of his improvement being machinery for performing agriculture operations by steam called "Bellinger's Agricultural Steam Apparatus".

Be it known that I, Edmunc C.Bellinger of Barnwell District, State of South Carolina, have made an improvement in the useful arts being certain machinery for performing agricultural operations by cteam called "Bellinger's Steam Apparatus" which is described as follows reference being had to the annexed drawings making part of this description.

First there is a carriage on which to place a steam engine with pistons working horizontally, the wheels which support and move the carriage, the pulleys and drums over which the bands work for moving the ploughs. Harrows . etc., the apparatus for steering the carriage.

On the carriage a for carrying the Steam Engine arethe hind and two fore wheels b ;on the hubs of the hind wheels are two whirls c.One of about doubel the diameter of the other around which a band passed on each side of the carriage to whirls d on the crank axle c . Near the center of this carriage is an axle c having two cranks on it turning on gudgeons in boxes in the frame. These cranks are worked alternately by the two horizontal piston rods f, placed one on each side of the carriage In the middle of this crank axle is fixed a pulley or drum g with two or three grooves in it of different diameters to suit the different velocities required in the machine. Two pulleys or drums h are placed below the carriage to give direction to the band.

The Steering Apparatus i is constructed by having a semicircular wheel k cast on or attached to the axle of each fore wheel with a groove to receive a band made fast at the end of each diameter of the segment wheel. In the centre is fixed a wheel or pulley l on the end of a Shaft or handle,having a groove in it to receive a band; a band passes round this wheel and each of the segment wheels. A connecting rod m unites the segment wheels and causes them to turn together the machine is directed by a person on top of the carriage two The steam engine is made in the usual way and works the/pistons on each side of the carriage. There is also another carriage n for for supporting the pulleys o, over which the bands p pass at the opposite side of the piece of ground required to be ploughed, harrowed, mowed, rolled etc., a mitre or crown wheel q is fixed on one of the pulleys, an axle r with a fall wheel s working into it and an endless screw t fixed on the same axle and working into a cog wheel n fixed on the axle of the two hind wheels of the carriage; the two fore wheels serve to support the front of the carriage and aid in turning it.

OPERATION: the two carriages being placed in the field parallel to each other and the band passed round the several wheels or pulleys before described, the plows, harrows or instruments being attached to the band and the Steam Engine put in motion gives motion to the band with the instruments attached thereto performing the required operation When one ridge of land is operated on both the carriages are moved forward and parallel and another ridge worked and so till the whole field is acted on.

The invention here claimed and required to be secured by Letters Patent consists in the peculiar construction of the before described agricultural steam apparatus with the arrangement of the several parts particularly the mode of carrying the machinery by a revolving bandworking over pulleys etc., placed on carriages parallel to each other on the opposite sides of the field for ploughing, harrowing, planting mowing etc., by the agency of steam. Done at the City of Washington, this 1st day of November 183[illegible].

Witnesses )
William P. Elliott, )
Samuel P. Walker, )

Edmund C. Bellinger,